United States Patent
Kamiyama et al.

[11] Patent Number: 6,085,794
[45] Date of Patent: Jul. 11, 2000

[54] PIPE LINING METHOD

[75] Inventors: Takao Kamiyama, Hiratsuka; Yasuhiro Yokoshima, Ibaraki-ken; Shigeru Endoh, Yasato-machi; Hiroyuki Aoki, Tokorozawa, all of Japan

[73] Assignees: Shonan Gosei-Jushi Seisakusho K.K., Hiratsuka; Yokoshima & Company, Ibaraki-ken; GET Inc., Tsukuba; OAR Company, Tokorozawa, all of Japan

[21] Appl. No.: 09/422,311

[22] Filed: Oct. 21, 1999

[30] Foreign Application Priority Data

Oct. 26, 1998 [JP] Japan .................................. 10-303463

[51] Int. Cl.[7] .................................................. F16L 55/162
[52] U.S. Cl. .............................. 138/98; 138/97; 156/287; 264/36.17
[58] Field of Search ........................ 138/97, 98; 156/287, 156/294, 94; 264/36.17, 36.22

[56] References Cited

U.S. PATENT DOCUMENTS

| | | | |
|---|---|---|---|
| 5,329,063 | 7/1994 | Endoh ......................................... | 138/98 |
| 5,454,401 | 10/1995 | Kamiyama et al. ...................... | 138/98 |
| 5,498,389 | 3/1996 | Kamiyama et al. ...................... | 264/516 |
| 5,916,406 | 6/1999 | Kamiyama et al. ...................... | 138/97 |
| 5,971,031 | 10/1999 | Kamiyama et al. ...................... | 138/98 |
| 6,006,787 | 12/1999 | Kamiyama et al. ...................... | 138/98 |

*Primary Examiner*—James Hook
*Attorney, Agent, or Firm*—Knobbe, Martens, Olson & Bear, LLP

[57] ABSTRACT

A pipe lining method is provided for simply positioning a flange of a branch pipe liner bag to a branch pipe opening of a main pipe in a short period of time, and preventing the branch pipe liner bag from having a locally insufficient strength. A branch pipe liner bag is everted and inserted into a branch pipe with a fluid pressure. With the branch pipe liner bag pressed onto the inner wall of the branch pipe, a hardenable resin impregnated in the branch pipe liner bag is hardened to line the branch pipe. Then, a main pipe liner bag is everted and inserted into a main pipe with a fluid pressure. With the main pipe liner bag pressed onto the inner wall of the main pipe, a hardenable resin impregnated in the main pipe liner bag is hardened to line the main pipe. The fluid pressure acting inside the main pipe liner bag is adjusted such that a portion of the hardenable resin impregnated in the main pipe liner bag is oozed out. The oozed hardenable resin is introduced into a clearance space, and hardened therein.

5 Claims, 10 Drawing Sheets

PIPE LINING METHOD

BACKGROUND OF THE INVENTION

1. Field of the Invention

The present invention relates generally to branch pipe lining techniques, and more particularly, to a pipe lining method which is suitable for lining a branch pipe as well as a main pipe.

2. Description of the Related Art

When an underground pipe, such as pipelines and passageways, becomes defective or too old to perform properly, the pipe is repaired and rehabilitated without digging the earth to expose the pipe and disassembling the sections of the pipe. This non-digging method of repairing an underground pipe has been known and practiced commonly in the field of civil engineering. The pipe lining method utilizes a tubular pipe liner bag made of a resin absorbent material impregnated with a hardenable resin, and having the outer surface covered with a highly air-tight plastic film. The tubular pipe liner bag is inserted into a pipe to be repaired by means of a pressurized fluid such that the pipe liner bag is turned inside out as it proceeds deeper in the pipe. Hereinafter, this manner of insertion shall be called "everting". When the entire length of the tubular liner bag is everted (i.e., turned inside out) into the pipe, the everted tubular liner is pressed against the inner wall of the pipe by a pressurized fluid, and the tubular flexible liner is hardened as the hardenable resin impregnated in the liner is heated, which is effected by heating the fluid filling the tubular liner bag. It is thus possible to line the inner wall of the defective or old pipe with a rigid liner without digging the ground and disassembling the pipe sections.

The foregoing pipe lining method can be similarly applied to the lining of a main pipe of sewerage pipes or the like and a branch pipe or a plurality of branch pipes branched off the main pipe. More specifically, the lining of a branch pipe employs a branch pipe liner bag which typically comprises a tubular resin absorbent material having a hardened flange at one end and the outer surface coated with a highly air-tight plastic film, and an unhardened hardenable resin impregnated in the tubular resin absorbent material. This branch pipe liner bag is introduced into a main pipe. With the flange of the branch pipe liner bag closely connected to the circumference of a branch pipe opening of a main pipe, the branch pipe liner bag is everted (i.e. turned inside out) into the branch pipe from the main pipe toward the ground surface by a pressurized fluid, and pressed onto the inner wall of the branch pipe. Then, while the branch pipe liner bag is being kept pressed onto the inner wall, the branch pipe liner bag is heated or otherwise processed to cause a hardenable resin impregnated therein to harden, thus completing the lining of the branch pipe.

With the conventional branch pipe liner bag, however, the flange is formed such that its inner diameter becomes identical to the inner diameter of the hardened tubular resin absorbent material. It is therefore difficult to exactly position the cylinder of the flange, supported by a working robot introduced into the main pipe, to the branch pipe opening and fit the flange into the branch pipe from the branch pipe opening while monitoring the inside of the main pipe with a TV camera. This work requires expertise and a lot of time.

If inexact positioning of the flange of the branch pipe liner bag to the branch pipe opening causes a slight shift of the flange from the branch pipe opening, the shifted portion of the branch pipe liner bag is wrinkled.

To eliminate this problem, the inventors of the present invention have previously proposed an improved branch pipe liner bag in Japanese Patent Application No. 9-176166, as illustrated in FIG. 6. Specifically, the illustrated branch pipe liner bag 1 has a flange 3 whose inner diameter d1 is smaller than the inner diameter d of a hardened tubular resin absorbent material 2.

However, when the branch pipe liner bag 1 according to the above-mentioned proposal is used to line a branch pipe 11 as illustrated in FIG. 6, a clearance space S1 is formed between a cylinder portion 3b continuous to the flange 3 of the hardened branch pipe liner bag 1 and the branch pipe 11, causing the following problems.

Specifically, if a load due to ground subsidence, earthquake or the like acts on a main pipe 10 buried in the ground, a load stress concentrates on the connection of the main pipe 10 and the branch pipe 11. Since the cylinder portion 3b continuous to the flange 3 of the branch pipe liner bag 1 is not in close contact with the opening of the branch pipe 11 or the inner wall of the branch pipe 11 due to the clearance space S1, it cannot be protected by surrounding walls from deformations due to an external load. Thus, the cylinder portion 3b exhibits a lower resistance to a load than other portion of the branch pipe liner bag which is hardened in close contact with the inner wall of the branch pipe 11.

OBJECTS AND SUMMARY OF THE INVENTION

The present invention has been made to solve the problem mentioned above, and it is an object of the present invention to provide a pipe lining method which is capable of simply positioning a flange of a branch pipe liner bag to a branch pipe opening of a main pipe in a short period of time, and of preventing a locally insufficient strength in the branch pipe liner bag.

To achieve the above object, the present invention provides a pipe lining method for lining a main pipe and a branch pipe branched off the main pipe, the method comprising the steps of providing a branch pipe liner bag, the branch pipe liner bag comprising a tubular resin absorbent material, a plastic film having a highly air-tight property, the plastic film being coated over the outer surface of the tubular resin absorbent material, a hardened flange formed at one end of the tubular resin absorbent material, the flange having an inner diameter smaller than an inner diameter of the tubular resin absorbent material, the flange including a cylindrical portion continuous thereto, and an unhardened hardenable resin impregnated in the tubular resin absorbent material; providing a main pipe liner bag, the main pipe liner bag comprising a tubular resin absorbent material, a plastic film having a highly air-tight property, the plastic film being coated over the outer surface of the tubular resin absorbent material, and an unhardened hardenable resin impregnated in the tubular resin absorbent material; abutting the flange of the branch pipe liner bag to the circumference of a branch pipe opening; everting and inserting the branch pipe liner bag from the main pipe into the branch pipe with a fluid pressure; pressing the branch pipe liner bag onto the inner wall of the branch pipe; hardening the hardenable resin impregnated in the tubular resin absorbent material, with the branch pipe liner bag pressed onto the inner wall of the branch pipe, to line the branch pipe; everting and inserting the main pipe liner bag into the main pipe with a fluid pressure, the fluid pressure acting inside the main pipe liner bag inserted into the main pipe, the fluid pressure being adjusted such that a portion of the hardenable resin impregnated in the resin absorbent material of the main pipe liner bag is oozed out, the oozed hardenable resin passing through a gap between the flange of the branch pipe liner bag and the inner wall of the main pipe, and flowing into a clearance space formed between the cylinder portion continuous to the flange of the branch pipe liner bag and the inner wall of the branch pipe opening and the inner wall of the branch pipe; pressing the main pipe liner bag onto the inner wall of the main pipe; and hardening the hardenable resin impregnated in the tubular resin absorbent material as well as the hardenable resin flowing into the clearance space, with the main pipe liner bag pressed onto the inner wall of the main pipe, to line the main pipe.

The flange of the branch pipe liner bag may be formed with at least one hole extending therethrough such that the hardenable resin oozed out of the main pipe liner bag passes through the holes and flows into the clearance space.

Preferably, the step of providing a main pipe liner bag includes adding bis-(4-t-butylcyclohexy)peraxy-dicarbonate to the hardenable resin impregnated in the tubular resin absorbent material of the main pipe liner bag as a hardening catalytic substance.

The hardenable resin impregnated in the tubular resin absorbent material of the main pipe liner bag may be unsaturated polyester resin or vinyl ester resin, and the step of providing a main pipe liner bag preferably includes setting viscosity of the hardenable resin in a range of 20 to 80 poises, and thioxotropy of the hardenable resin in a range of 1.2 to 6.0 at temperature of 23° C.

The tubular resin absorbent material of the main pipe liner bag may be formed of unwoven fabric made of fiber having a size in a range of 1 to 15 deniers, and the step of everting and inserting the main pipe liner bag into the main pipe with a fluid pressure preferably includes setting the fluid pressure acting inside the main pipe liner bag in a range of 0.2 to 1.5 kg/cm$^2$.

According to the pipe lining method of the present invention, the clearance space formed between the cylinder portion continuous to the flange of the hardened branch pipe liner bag and the branch pipe opening and the inner wall of the branch pipe is filled with the hardenable resin oozed out of the main pipe liner bag. Since th is hardenable resin hardened in the clearance space provides a reinforcement to a lower strength portion of the branch pipe liner bag (cylinder portion), the branch pipe liner bag is prevented from suffering a locally insufficient strength. Also, since the inner diameter dl of the flange of the branch pipe liner bag is set smaller than the inner diameter d of the hardened tubular resin absorbent material (d1<d), the outer diameter of the cylinder portion continuous to the flange is smaller than the inner diameter of a branch pipe opening, so that the flange of the branch pipe liner bag can be readily positioned to the branch pipe opening in a short time.

In addition, since the flange of the branch pipe liner bag is formed with holes, the hardenable resin oozed out of the main pipe liner bag conveniently passes through the holes in addition to passing through the gap between the flange of the branch pipe liner bag and the inner wall of the main pipe, thereby introducing the hardenable resin more efficiently into the clearance space.

Further, since bis-(4-t-butylcyclohexy )peraxy-dicarbonate is added to the hardenable resin impregnated in the main pipe liner bag as a hardening catalytic substance for ensuring that the hardenable resin is hardened even if it is in contact with water, defective hardening will never occur even if hardenable resin fill ing the clearance space is in contact with underground water or the like, thereby providing a stable reinforcing effect of the hardenable resin for the branch pipe liner bag.

Further, by appropriately setting the viscosity and thixotropy of the hardenable resin impregnated in the main pipe liner bag, it is possible to ensure a required design value for the thickness of the hardened main pipe liner bag as well as properly ooze a required amount of hardenable resin out of the main pipe lin er bag to fill the clearance space therewith.

More over, with the tubular resin absorbent material of the branch pipe liner bag made of unwoven fabric with fiber of appropriate size, and a properly set pressure acting inside the main pipe liner bag, it is possible to ensure a required design value for the thickness of the hardened main pipe liner bag as well as to properly ooze a required amount of hardenable resin out of the main pipe liner bag to fill the clearance space therewith.

The above and other objects, features, and advantages of the present invention will become apparent from the following detailed description of the preferred embodiments thereof when read in conjunction with the accompanying drawings.

DESCRIPTION OF THE PREFERRED EMBODIMENTS

The present invention will hereinafter be described in connection with several preferred embodiments thereof with reference to the accompanying drawings.

Figure 1:
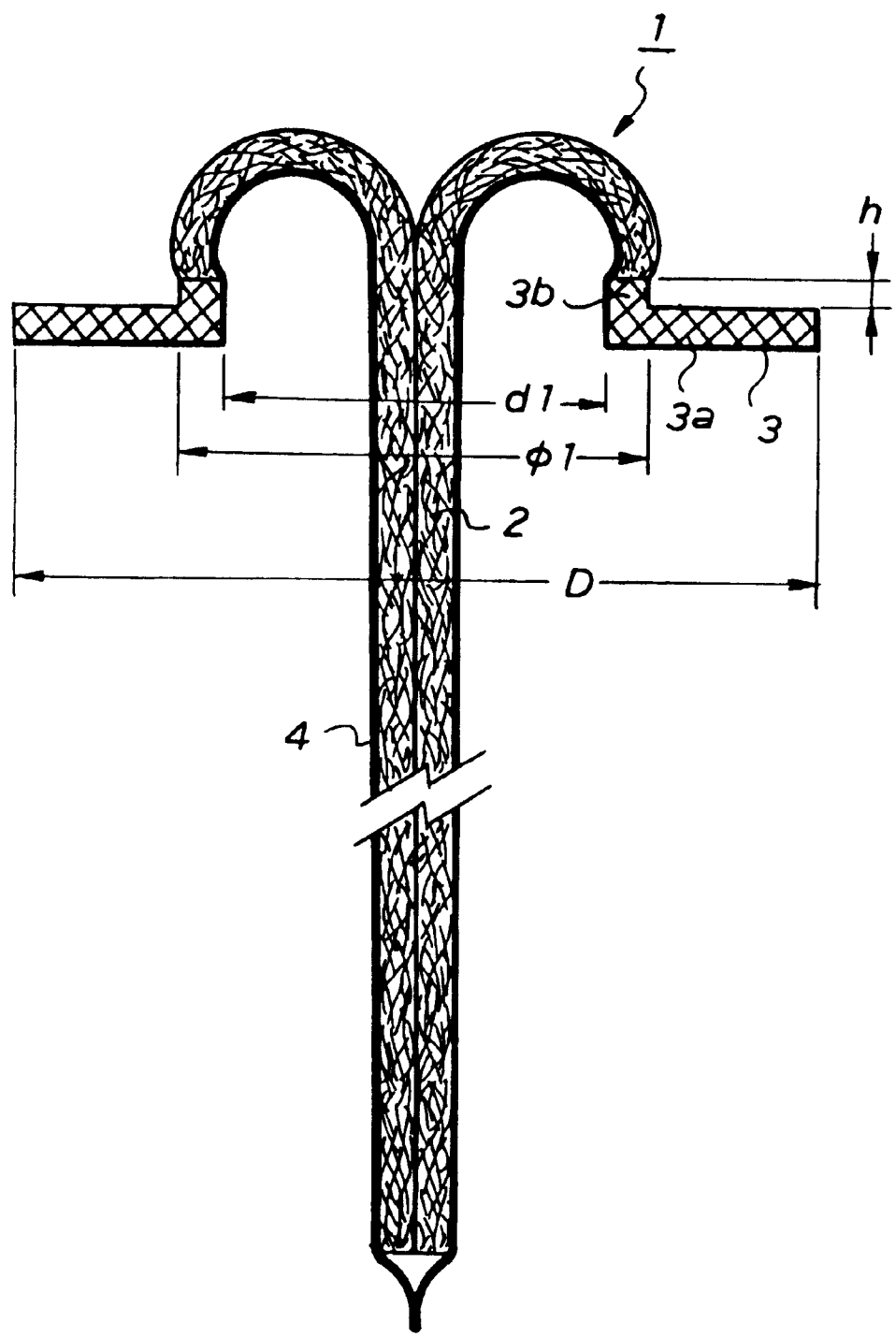
FIG. 1 is a cross-sectional view of a branch pipe 1 iner bag for use in a pipe lining method (branch pipe lining method) according to the present invention.

FIG. 1 is a cross-sectional view of a branch pipe liner bag 1 according to an embodiment of the present invention. The illustrated branch pipe liner bag comprises a tubular resin absorbent material 2 having one end turned around to form a hardened flange 3. A main portion of the tubular resin absorbent material 2 except for the flange 3 is impregnated with an unhardened liquid thermosetting resin. The tubular resin absorbent material 2 has its outer surface coated with a highly air-tight plastic film 4, and an end portion at which the tubular resin absorbent material 2 and the plastic film 4 are joined together is sealed as illustrated.

A material for the unwoven fabric constituting the tubular resin absorbent material 2 may be selected from polyester, polypropylene, nylon, acrylic fabric, vinylon or the like. The unhardened thermosetting resin impregnated in the tubular resin absorbent material 2 may be unsaturated polyester resin, epoxy resin, or the like. A material for the plastic film 4 may be selected from polyurethane, polyethylene, copolymer of polyethylene and nylon, vinyl chloride, and so on.

The flange 3 comprises a flange portion 3a curved to substantially match the curvature of a main pipe 10 (see FIG. 2), later described, and a cylinder portion 3b integral with the flange portion 3a and continuous to the tubular resin absorbent material 2. The plastic film air-tight 4 seals the outer surface of the tubular resin absorbent material 2 including a boundary portion with the flange 3.

In the branch pipe liner bag 1 according to the present invention, the inner diameter d1 of the flange 3 is set smaller than the inner diameter d of the hardened tubular resin absorbent material 2 (d1<d), the outer diameter $\Phi 1$ of the cylinder portion 3b of the flange 3 is set smaller than the inner diameter $\Phi$ of a branch pipe opening (an end of the branch pipe 11 confluent to the main pipe 10) ($\Phi 1<\Phi$), and the height h of the cylinder portion 3b is chosen in a range of 0.5 m/m to 50 m/m. Further, the outer diameter D of the flange portion 3a of the flange 3 is set larger than the inner diameter $\Phi$ of the branch pipe opening (D>$\Phi$). The flange 3 comprising the flange portion 3a and the cylinder portion 3b maintains its shape with the help of the hardenable resin impregnated therein to be hardened subsequently.

Next, a pipe lining method according to the present invention will be described below. It should be noted herein that in this pipe lining method, a main pipe 10 is lined after a branch pipe 11 has been lined.

First, a method of lining a branch pipe using the branch pipe liner bag constructed as described above will be described with reference to FIGS. 2–6.

FIGS. 2–6 are cross-sectional views illustrating, in order, a variety of steps in the branch pipe lining method according to an embodiment of the present invention. As illustrated, a main pipe 10 of a sewage pipe line or the like has a branch pipe 11, having a smaller diameter, confluent thereto.

Figure 2:
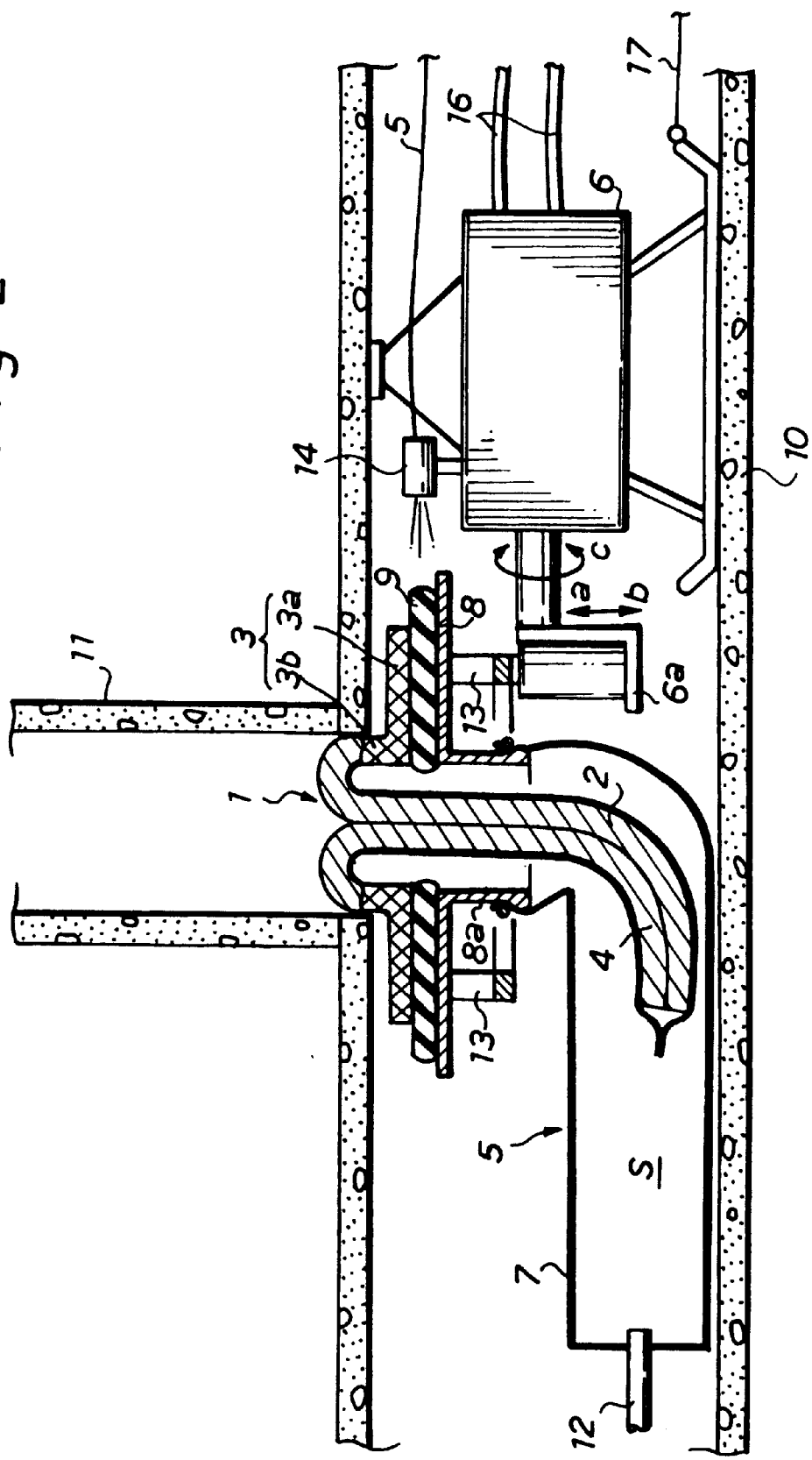
FIG. 2 is a cross-sectional view showing how the branch pipe liner bag is set in the pipe lining method (branch pipe lining method) according to the present invention.
Figure 3:
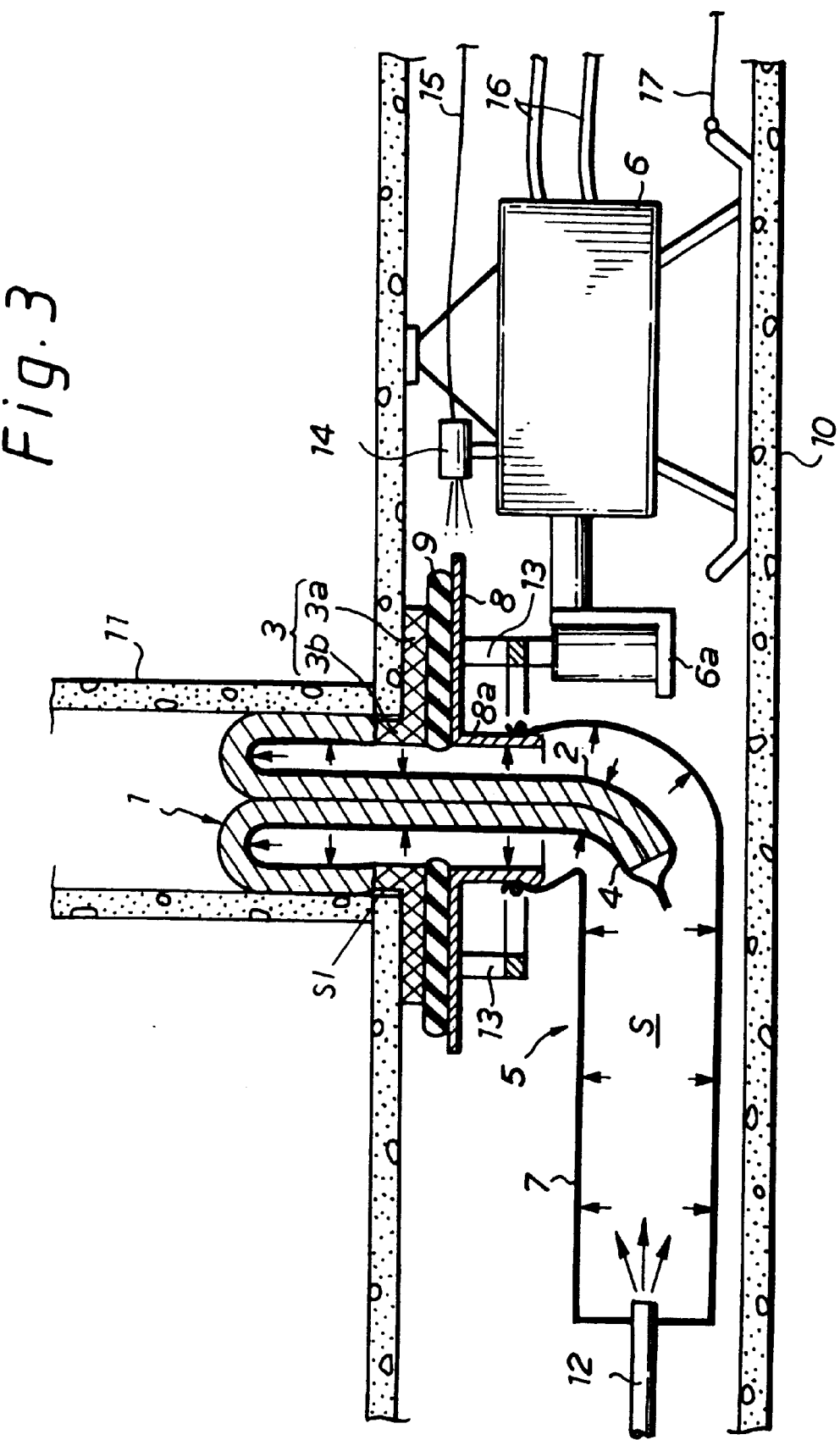
FIG. 3 is a cross-sectional view illustrating how the branch pipe liner bag is everted and inserted in the pipe lining method (branch pipe lining method) according to the present invention

In the present embodiment of the branch pipe lining method, a branch pipe lining unit 5 including a branch pipe liner bag 1 is movably introduced into the main pipe 10 with a working robot 6 connected to the branch pipe lining unit 5, as illustrated in FIG. 2.

In the state illustrated in FIG. 2, the branch pipe lining unit 5 has its main body portion inserted into a pressure bag 7, except for a flange 3 of the branch pipe liner bag 1, while the flange 3 remains in close contact with a setting head 8 attached to an end opening of the pressure bag 7 with an elastic body 9 such as rubber interposed therebetween, thereby forming a closed space S defined by the branch pipe liner bag 1 within the pressure bag 7.

The pressure bag 7 is connected at the other end thereof with an air hose 12, one end of which is open to the closed space S with in the pressure bag 7, and the other end of which is connected to an air compressor, not shown, which may be installed on the ground.

The working robot 6, which is hydraulically driven, has a head 6a movable in directions indicated by arrows a and b, and rotatable in a direction indicated by an arrow c. On the head 6a, the setting head 8 of the branch pipe lining unit 5 is removably attached with a plurality of urging arms 13. The urging arms 13 are positioned on a diagonal passing through the central axis of a cylinder portion 8a of the setting head 8 through which the branch pipe lining bag 1 is passed, or in the vicinity thereof.

The working robot 6 comprises a TV camera 14 installed thereon for monitoring the inside of the main pipe 10. The TV camera 14 is connected to an electric cable 15, while the working robot 6 is connected to an oil compression hose 16 and a pull rope 17.

In the state mentioned above, the working robot 6 and the branch pipe lining unit 5 supported thereby are integrally moved with in the main pipe 10. In this event, the flange 3 of the branch pipe liner bag 1 is positioned at an opening of the branch pipe 11 as the operation within the main pipe 10 is monitored through the TV camera 14 on the ground, as illustrated in FIG. 2.

In the branch pipe liner bag 1 of the present invention, since the outer diameter $\Phi 1$ of the cylinder portion 3b of the flange 3 is set smaller than the inner diameter $\Phi$ of the branch pipe opening, the cylinder portion 3b of the flange 3 can be easily positioned to the branch pipe opening in a reduced time.

After the flange 3 of the branch pipe liner bag 1 is positioned to the branch pipe opening as described above, the head 14 of the working robot 12 is moved upward to urge the flange portion 3a of the flange 3 of the branch pipe lining bag 1 against the periphery of the branch pipe opening for close contact therebetween. In this case, since the height h of the cylinder portion 3b of the flange 3 is chosen in a range of 0.5 m/m to 50 m/m, the positioning of the flange 3 to the branch pipe opening is confirmed as long as the flange portion 3a of the flange 3 is in close contact with the periphery of the branch pipe opening. In addition, since the cylinder portion 3b of the flange 3 is engaged with the branch pipe opening to function as an anchor, it is ensured to prevent the flange 3 from shifting from the branch pipe opening.

Next, as the air compressor, not shown, installed on the ground is driven to supply compressed air into the closed space S within the pressure bag 7 through the air hose 12, the main body portion (tubular resin absorbent material 2) except for the flange 3 of the branch pipe liner bag 1 is sequentially inserted into the branch pipe 11 from the main pipe 10 toward the ground (upward) as it receives the pressure of the compressed air. In this event, the plastic film 4 air-tight seals the outer surface of the tubular resin absorbent material 2 including the boundary portion with the flange 3, the elastic body 9 is interposed between the flange 3 and the setting head 8, and the flange 3 is uniformly pressed against the periphery of the branch pipe opening of the main pipe 10 with the plurality of urging arms 13, so that a high sealability is maintained in the closed space S to prevent compressed air from leaking from the closed space S, thereby ensuring that the branch pipe liner bag 1 is everted into the branch pipe 11. It should be noted that as the elastic body 9, an air bag may be employed.

Figure 4:
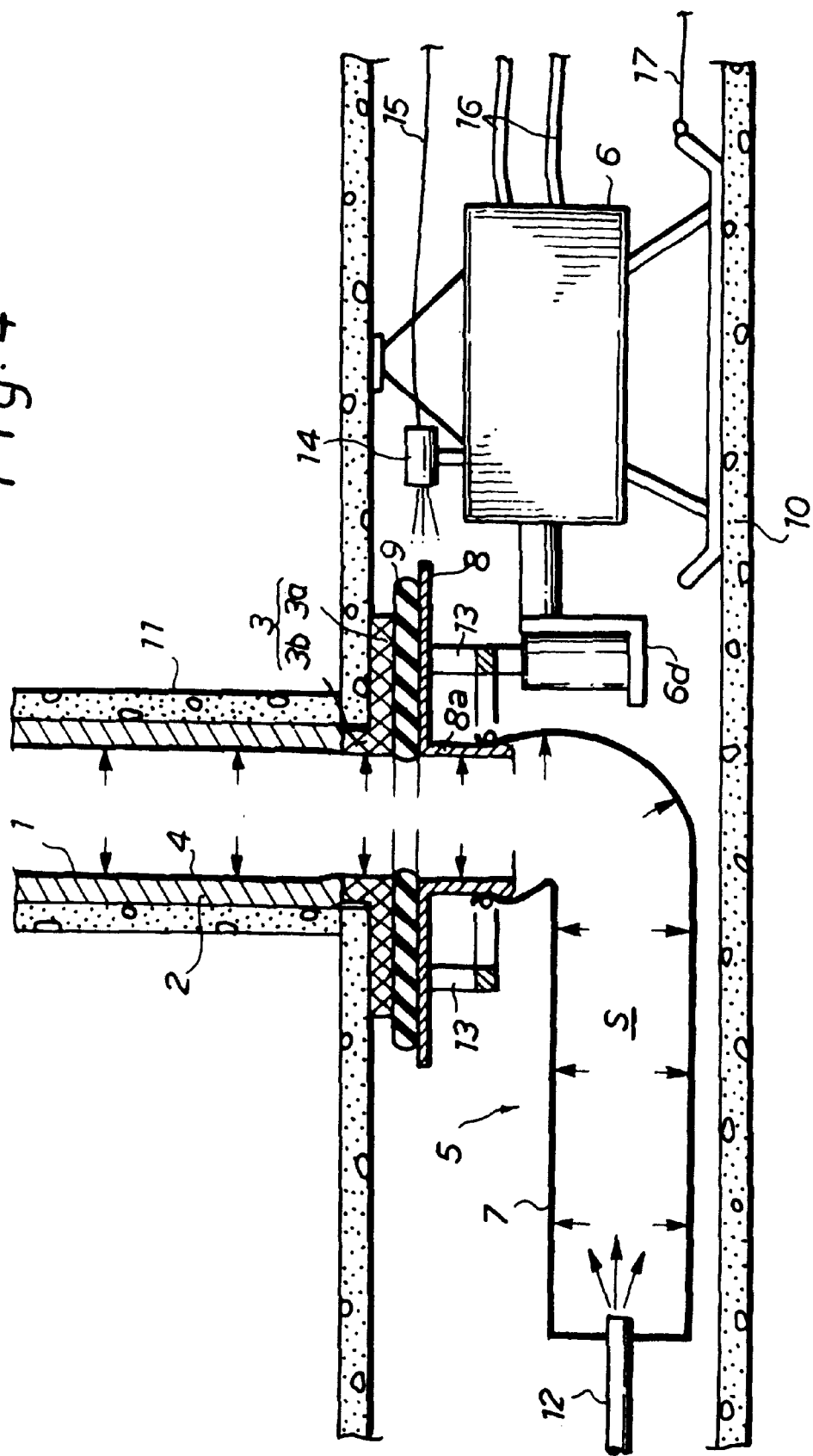
FIGS. 4 to 6 are cross-sectional views each illustrating a hardened branch pipe liner bag in the pipe lining method (branch pipe lining method) according to the present invention.
Figure 5:
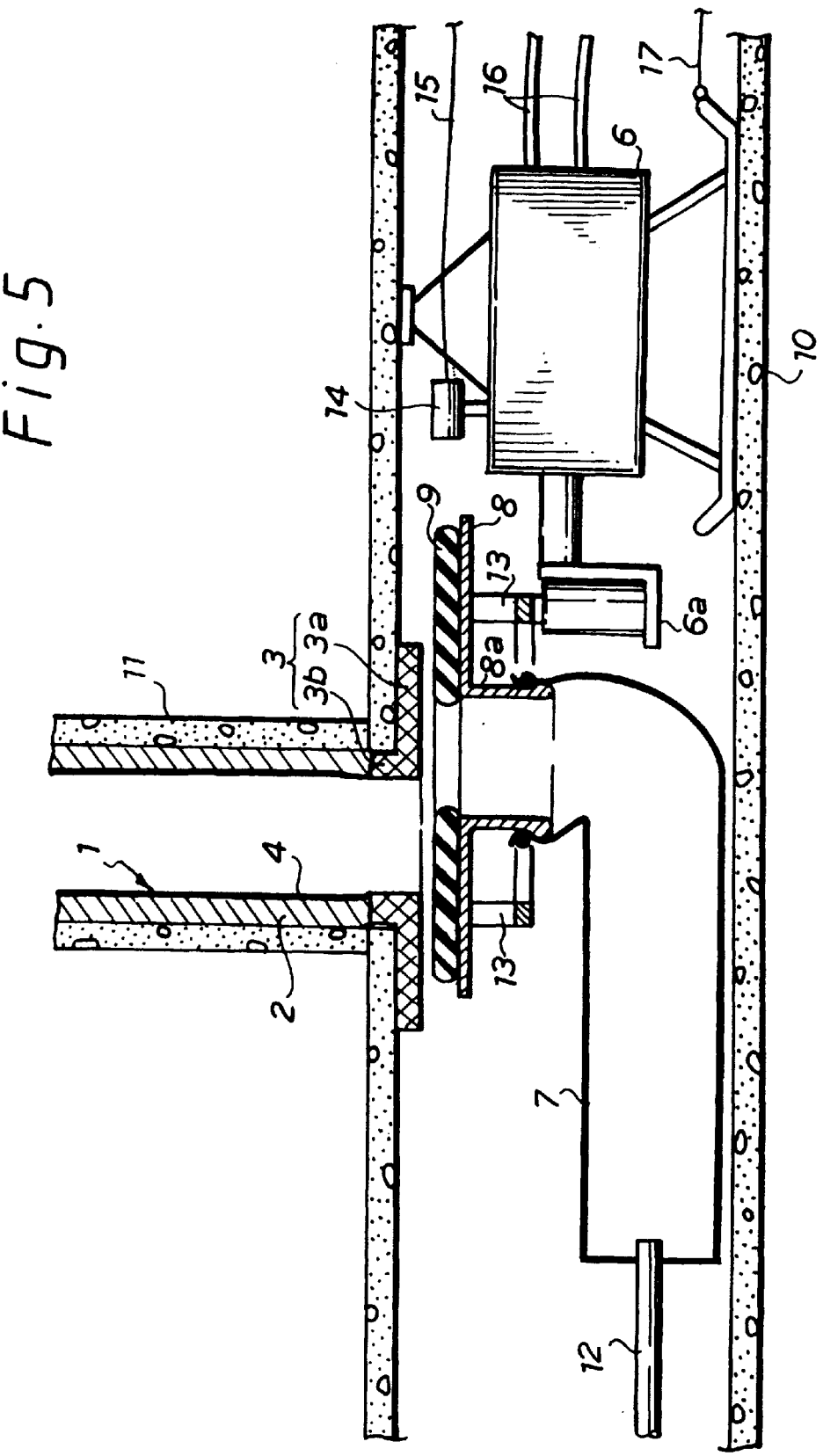

When the eversion of the branch pipe liner bag 1 into the branch pipe 11 is completed as described above, the branch pipe liner bag 1 is heated by an arbitrary means while the branch pipe liner bag 1 urged against the inner wall of the branch pipe 11 by the pressure of the compressed air, as illustrated in FIG. 4. This causes hardening of the thermosetting resin impregnated in the tubular resin absorbent material of the branch pipe liner bag 1, whereby the branch pipe 11 is lined by the hardened branch pipe liner bag 11, i.e., the branch pipe 11 is repaired.

If the branch pipe liner bag 1 is applied with pressure in a branch pipe having a curve in the vicinity of its opening, a force acts on the branch pipe liner bag 1 to straighten the same, possibly causing the flange 3 to shift from the branch pipe opening. However, in the present embodiment, since the cylinder portion 3b of the flange 3 is engaged with the branch pipe opening to function as an anchor, the flange 3 will never shift from the branch pipe opening during the hardening of the tubular resin absorbent material 2, thereby preventing the branch pipe liner bag 1 from being wrinkled.

Figure 6:
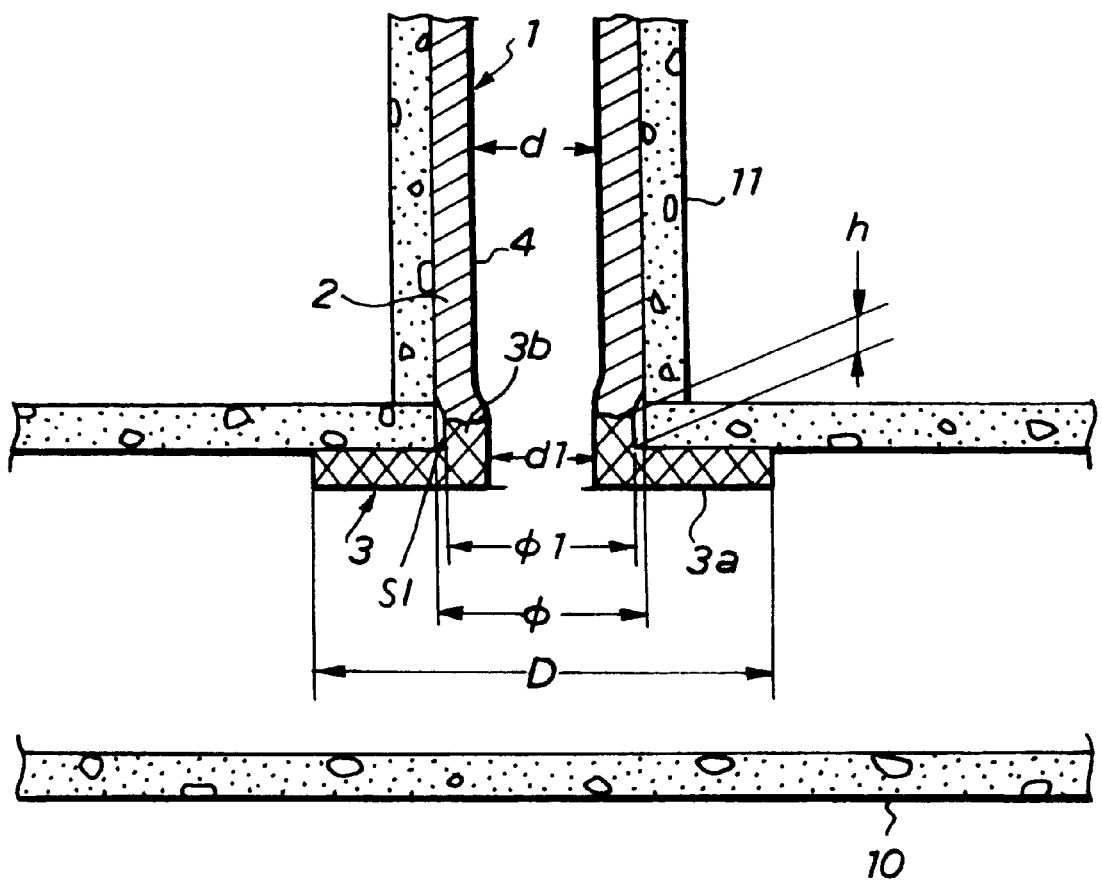

In the branch pipe liner bag 1, since the cylinder portion 3b of the flange 3 has the outer diameter Φ1 set smaller than the inner diameter Φ of the branch pipe opening (Φ1<Φ) as mentioned above, a clearance space S1 is formed between the cylinder portion 3b continuous to the flange 3 of the hardened branch pipe liner bag 1 and the inner walls of the branch pipe opening and the branch pipe 11 after the branch pipe liner bag 1 has been hardened within the branch pipe 11, as illustrated in FIG. 6.

Figure 7:
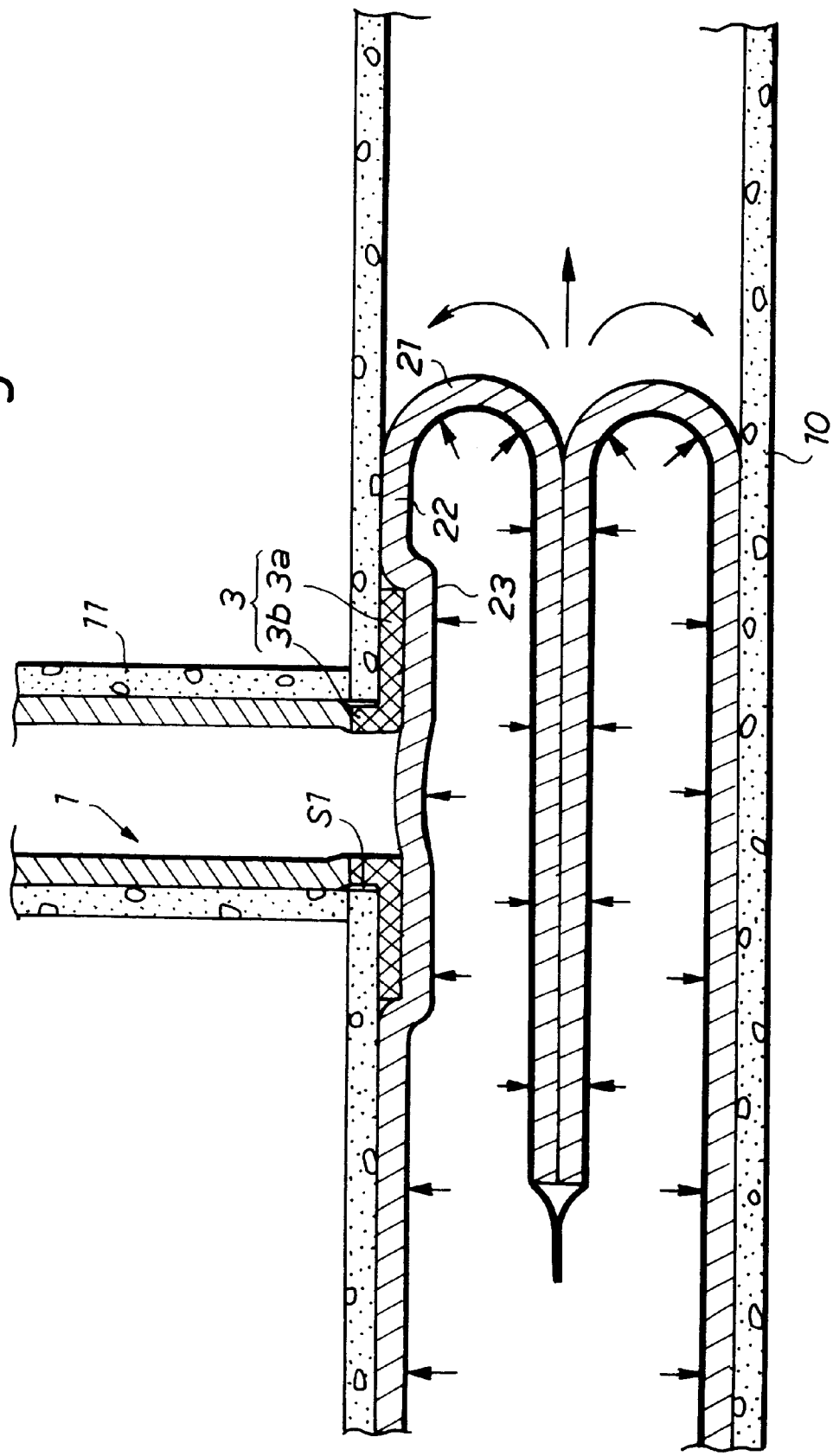
FIG. 7 is a cross-sectional view illustrating how the branch pipe liner bag is everted and inserted in the pipe lining method (branch pipe lining method) according to the present invention.
Figure 8:
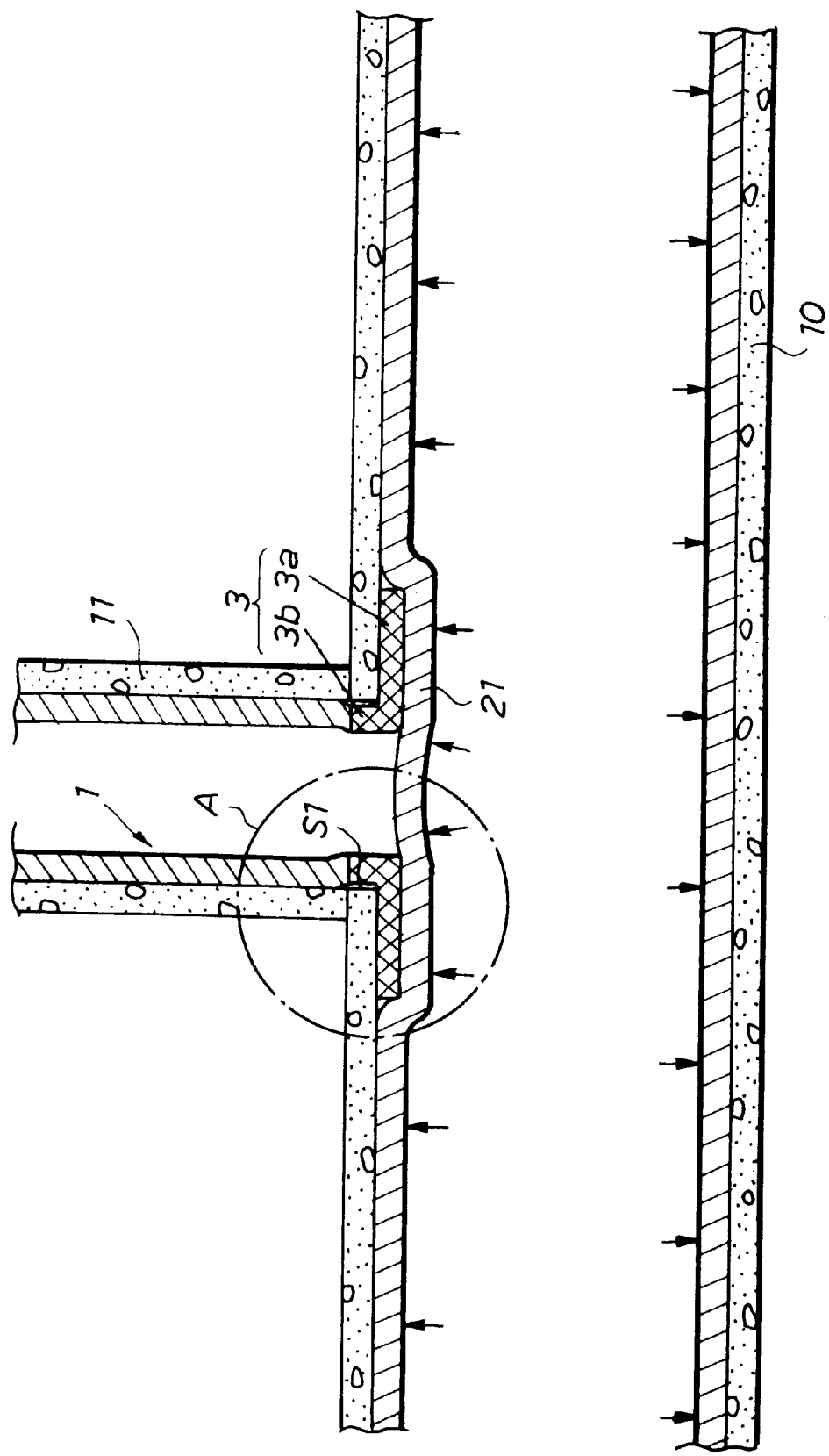
FIG. 8 is a cross-sectional view illustrating a hardened branch pipe liner bag in the pipe lining method (branch pipe lining method) according to the present invention.
Figure 9:
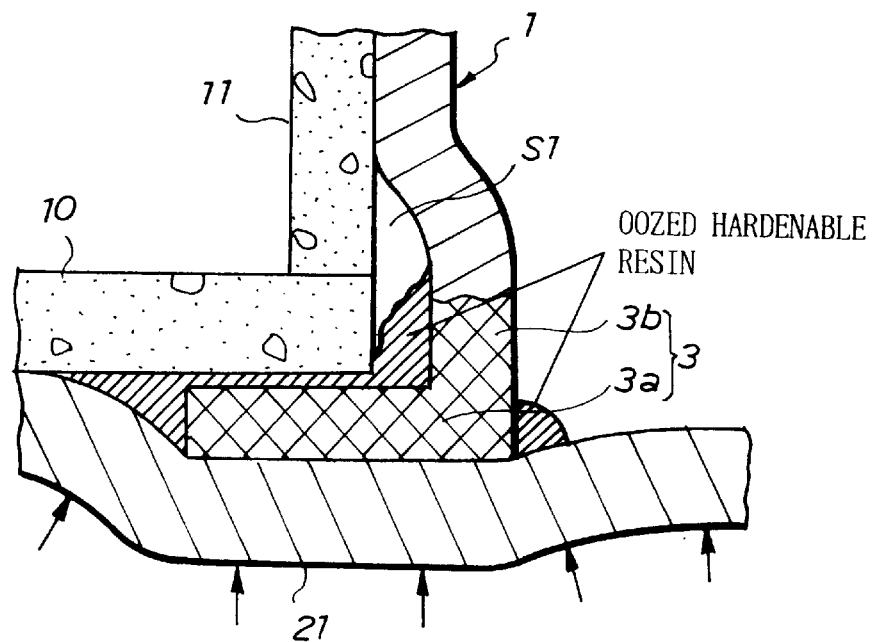
FIGS. 9 and 10 are enlarged cross-sectional views each illustrating in detail a portion surrounded by a circle A in FIG. 8.
Figure 10:
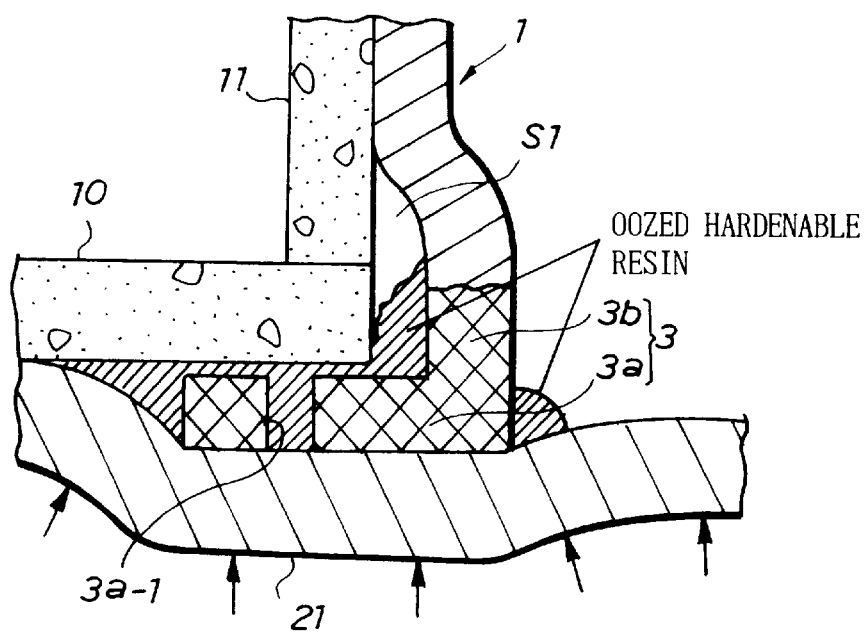
Figure 11:
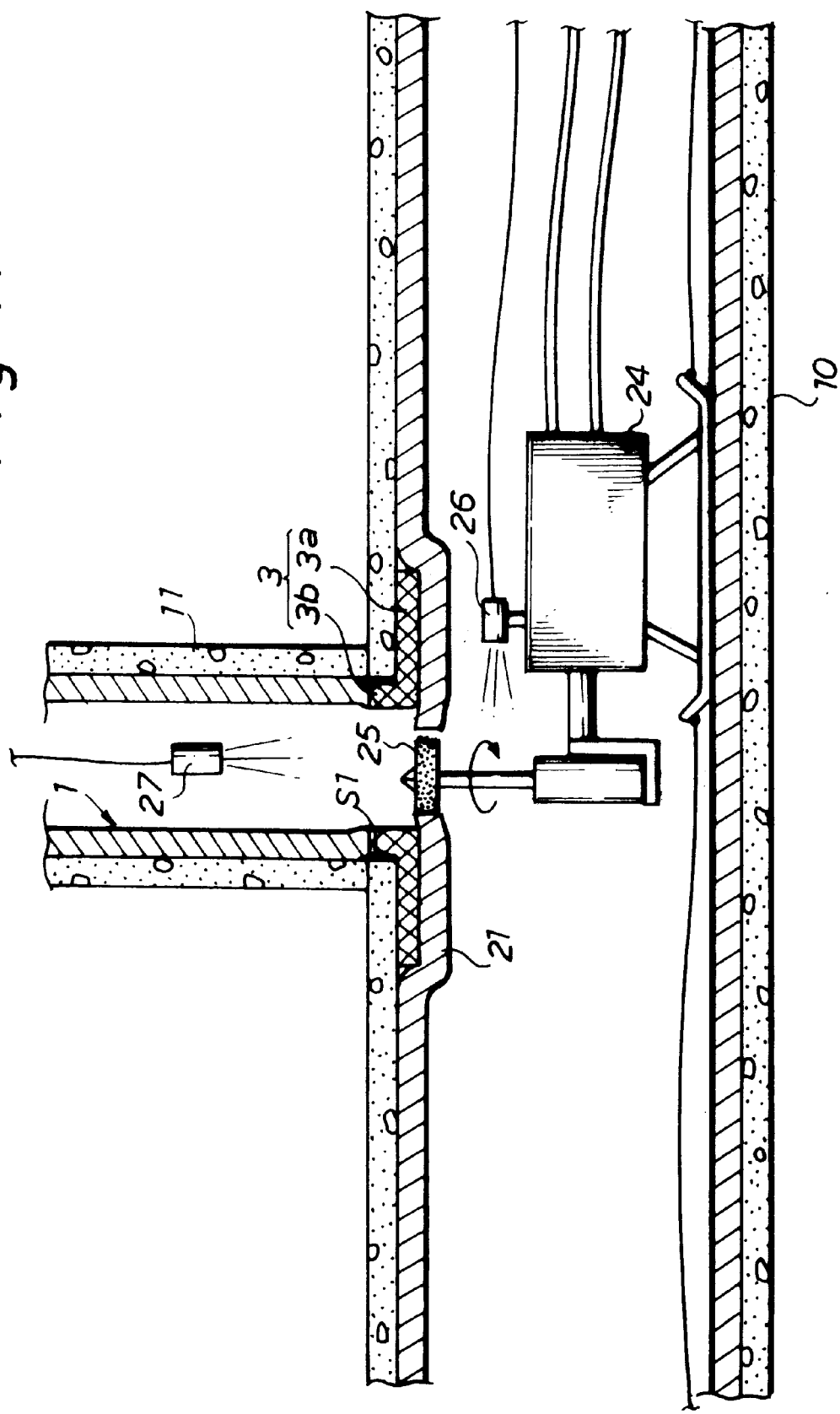
FIG. 11 is a cross-sectional view illustrating works involved in piercing the main pipe liner bag.

After the branch pipe 11 has been line as described above, the main pipe 10 is next subjected to the lining. A procedure for lining the main pipe 10 will hereinafter be described with reference to FIGS. 7 to 11. FIG. 7 is a cross-sectional view illustrating how a main pipe liner bag is everted and inserted; FIG. 8 is a cross-sectional view illustrating the main pipe liner bag after it has been hardened; FIGS. 9 and 10 are enlarged cross-sectional views illustrating in detail a portion surrounded by a circle A in FIG. 8; and FIG. 11 is a cross-sectional view illustrating works involved in piercing the main pipe liner bag.

As illustrated in FIG. 7, when a main pipe is to be lined, a main pipe liner bag 21 is everted and inserted into the main pipe by a fluid pressure such as an air pressure or the like. The main pipe liner bag is similar in structure to the branch pipe liner bag, and specifically formed of a tubular resin absorbent material 22 made of unwoven fabric, an unhardened liquid hardenable resin impregnated in the tubular resin absorbent material 22, and a highly air-tight plastic film 23 coated over the outer surface of the tubular resin absorbent material 22.

In the present embodiment, the tubular resin absorbent material 22 of the main pipe liner bag 21 is formed of unwoven fabric which in turn is made of fiber having the size in a range of 1 to 15 deniers. The hardenable resin impregnated in the unwoven fabric is unsaturated polyester resin or vinyl ester resin (thermally hardenable resin). In addition, a hardening catalytic substance such as bis-(4-t-butylcyclohexy)peraxy-dicarbonate (available from Kayaku Akuzo Co. under the product name "Perkadox 16") is added to the hardenable resin for ensuring that the hardenable resin is hardened even if it is in contact with water.

The hardenable resin has viscosity set in a range of 20 to 80 poises and thixotropy set in a range of 1.2 to 6.0 at temperature of 23° C. Further, aluminum hydroxide, fine sand, glass beads, alumina, magnesium oxide, or the like may be added to the hardenable resin as a filler, and aero gill or the like may also be added as thixolabile agent.

After the main pipe liner bag 21 has been completely inserted into the main pipe 10, the main pipe liner bag 21 is pressed onto the inner wall of the main pipe 10 by a fluid pressure which acts inside the main pipe liner bag 21. In this event, it has been found that when the fluid pressure acting inside of the main pipe liner bag 21 is adjusted in a range of 0.2 to 1.5 kg/cm², a portion of the hardenable resin impregnated in the main pipe liner bag 21 is properly oozed out of the main pipe liner bag 21, as illustrated in FIG. 9. The oozed hardenable resin passes through a gap between the flange 3 of the branch pipe liner bag 1 and the inner wall surface of the branch pipe 11, and flows into the aforementioned clearance space S1 formed between the cylinder portion 3b of the branch pipe liner bag 1 and the inner wall of the branch pipe 11 to fill the clearance space S1.

When the flange 3 of the branch pipe liner bag 1 is formed with a plurality of circular holes 3a-1 (only one of which is illustrated in FIG. 10) through the flange portion 3a as illustrated in FIG. 10, the hardenable resin oozed out of the main pipe liner bag 21 conveniently passes through the plurality of circular holes 3a-1 in addition to passing through the gap between the flange 3 of the branch pipe liner bag 1 and the inner wall of the main pipe 10, thereby introducing the hardenable resin more efficiently into the clearance space S1.

Subsequently, the main pipe liner bag 21 is heated by an arbitrary heating means while it remains pressed onto the inner wall of the main pipe 10, causing the hardenable resin impregnated in the main pipe liner bag and the hardenable resin filling the clearance space S1 to harden. Consequently, the inner wall surface of the main pipe 10 is lined with the hardened main pipe liner bag 21, and the cylindrical portion 3b of the branch pipe liner bag 1, which would otherwise suffer a lower strength, is reinforced by the hardenable resin hardened in the clearance space S1, thereby effectively preventing local insufficient strength in the branch pipe liner bag.

Also, in the present embodiment, since bis-(4-t-butylcyclo hexy)peraxy-dicarbonate is added to the hardenable resin impregnated in the main pipe liner bag 21 as a hardening catalytic substance for ensuring that the hardenable resin is hardened even if it is in contact with water, defective hardening will never occur even if hardenable resin filling the clearance space S1 is in contact with underground water or the like, thereby providing a stable reinforcing effect of the hardenable resin for the branch pipe liner bag 1.

When the hardenable resin impregnated in the main pipe liner bag 21 has lower viscosity and thixotropy, the hardenable resin is more easily oozed out of the main pipe liner bag 21 and flows into the clearance space S1. Nevertheless, such lower viscosity and thixotropy of the hardenable resin may cause the hardened main pipe liner bag 21 to have a thickness smaller than a predetermined design value. On the contrary, when the hardenable resin impregnated in the main pipe liner bag 21 has higher viscosity and thixotropy, the hardenable resin is oozed out of the main pipe liner bag 21 with more difficulties, so that the hardenable resin may fail to fill the clearance space S1.

It is therefore necessary to appropriately set the viscosity and thixotropy of the hardenable resin, the size of fiber constituting unwoven fabric of the main pipe liner bag 21, and a fluid pressure acting inside the main pipe liner bag 21 for properly oozing the hardenable resin out of the main pipe liner bag 21 and filling the clearance space S1 with the oozed hardenable resin.

To this end, in the present embodiment, these parameters are set as mentioned above. Specifically, unsaturated polyester resin or vinyl ester resin is used as the hardenable resin impregnated in the main pipe liner bag 21. The hardenable resin has viscosity set in a range of 20 to 80 poises and thixotropy set in a range of 1.2 to 6.0 at temperature of 23° C. In addition, the tubular resin absorbent material 22 of the main pipe liner bag 21 is formed of unwoven fabric which in turn is made of fiber having the size in a range of 1 to 15 deniers. Further, the fluid pressure acting inside of the main pipe liner bag 21 is adjusted in a range of 0.2 to 1.5 kg/cm².

With such settings, it is possible to ensure a required design value for the thickness of the hardened main pipe liner bag 21 as well as properly ooze a required amount of hardenable resin out of the main pipe liner bag 21 to fill the clearance space S1 therewith.

When the main pipe liner bag 21 has been hardened, the main pipe liner bag 21 is in close contact with the flange 3 of the branch pipe liner bag 1, and the main pipe liner bag 21 is integrally joined with the branch pipe liner bag 1 through the flange 3. However, since the main pipe liner bag 21 closes the branch pipe opening as illustrated in FIG. 6, the covering portion of the main pipe liner bag 21 must be cut out to communicate the branch pipe 11 to the main pipe 10.

For this purpose, as illustrated in FIG. 11, a cutter 25 mounted at the front end of a working robot 24 must be introduced into the main pipe 10, and driven to rotate to cut the portion of the main pipe liner bag 21 covering the branch pipe opening.

Specifically, the cutter 25 is remotely driven to cut the portion of the main pipe liner bag 21 covering the branch pipe opening, while monitoring the situation inside the main pipe 10 through a TV camera 27 installed on the working robot 24. In this way, the branch pipe 11 is open to the main pipe 10 so that the branch pipe 11 is placed in communication with the main pipe 10, thus completing a series of pipe lining operations.

As is apparent from the foregoing description, the clearance space formed between the cylinder portion continuous to the flange of the hardened branch pipe liner bag and the branch pipe opening and the inner wall of the branch pipe is filled with the hardenable resin oozed out of the main pipe liner bag. Since this hardenable resin hardened in the clearance space provides a reinforcement to a lower strength portion of the branch pipe liner bag (cylinder portion), the branch pipe liner bag is prevented from suffering a locally insufficient strength. Also, since the inner diameter d1 of the flange of the branch pipe liner bag is set smaller than the inner diameter d of the hardened tubular resin absorbent material (d1<d), the outer diameter of the cylinder portion continuous to the flange is smaller than the inner diameter of a branch pipe opening, so that the flange of the branch pipe liner bag can be readily positioned to the branch pipe opening in a short time.

In addition, since the flange of the branch pipe liner bag is formed with holes, the hardenable resin oozed out of the main pipe liner bag conveniently passes through the holes in addition to passing through the gap between the flange of the branch pipe liner bag and the inner wall of the main pipe, thereby introducing the hardenable resin more efficiently into the clearance space.

Further, since bis-(4-t-butylcyclohexy)peraxydicarbonate is added to the hardenable resin impregnated in the main pipe liner bag as a hardening catalytic substance for ensuring that the hardenable resin is hardened even if it is in contact with water, defective hardening will never occur even if hardenable resin filling the clearance space is in contact with underground water or the like, thereby providing a stable reinforcing effect of the hardenable resin for the branch pipe liner bag.

Further, by appropriately setting the viscosity and thixotropy of the hardenable resin impregnated in the main pipe liner bag, it is possible to ensure a required design value for the thickness of the hardened main pipe liner bag as well as properly ooze a required amount of hardenable resin out of the main pipe liner bag to fill the clearance space therewith.

Moreover, with the tubular resin absorbent material of the branch pipe liner bag made of unwoven fabric with fiber of appropriate size, and a properly set pressure acting inside the main pipe liner bag, it is possible to ensure a required design value for the thickness of the hardened main pipe liner bag as well as to properly ooze a required amount of hardenable resin out of the main pipe liner bag to fill the clearance space therewith.

While the present invention has been described in connection with its preferred embodiments, it is to be understood that various modifications will occur to those skilled in the art without departing from the spirit of the invention. The scope of the present invention is therefore to be determined solely by the appended claims.

What is claimed is:

1. A pipe lining method for lining a main pipe and a branch pipe branched off said main pipe, said method comprising the steps of:

providing a branch pipe liner bag, said branch pipe liner bag comprising a tubular resin absorbent material, a plastic film having a highly air-tight property, said plastic film being coated over the outer surface of said tubular resin absorbent material, a hardened flange formed at one end of said tubular resin absorbent material, said flange having an inner diameter smaller than an inner diameter of said tubular resin absorbent material, said flange including a cylindrical portion continuous thereto, and an unhardened hardenable resin impregnated in said tubular resin absorbent material;

providing a main pipe liner bag, said main pipe liner bag comprising a tubular resin absorbent material, a plastic film having a highly air-tight property, said plastic film being coated over the outer surface of said tubular resin absorbent material, and an unhardened hardenable resin impregnated in said tubular resin absorbent material;

abutting said flange of said branch pipe liner bag to the circumference of a branch pipe opening;

everting and inserting said branch pipe liner bag from the main pipe into the branch pipe with a fluid pressure;

pressing said branch pipe liner bag onto the inner wall of the branch pipe;

hardening said hardenable resin impregnated in said tubular resin absorbent material, with said branch pipe liner bag pressed onto the inner wall of the branch pipe, to line the branch pipe;

everting and inserting said main pipe liner bag into the main pipe with a fluid pressure, said fluid pressure acting inside said main pipe liner bag inserted into the main pipe, said fluid pressure being adjusted such that a portion of the hardenable resin impregnated in the resin absorbent material of said main pipe liner bag is oozed out, said oozed hardenable resin passing through a gap between the flange of said branch pipe liner bag and the inner wall of said main pipe, and flowing into a clearance space formed between the cylinder portion continuous to the flange of said branch pipe liner bag and the inner wall of the branch pipe opening and the inner wall of said branch pipe;

pressing said main pipe liner bag onto the inner wall of the main pipe; and hardening said hardenable resin impregnated in said tubular resin absorbent material as well as said hardenable resin flowing into said clearance space, with said main pipe liner bag pressed onto the inner wall of the main pipe, to line the main pipe.

2. A pipe lining method according to claim 1, wherein said flange of said branch pipe liner bag is formed with at least one hole extending therethrough such that said hardenable resin oozed out of said main pipe liner bag passes through said holes and flows into said clearance space.

3. A pipe lining method according to claim 1, wherein said step of providing a main pipe liner bag includes adding bis-(4-t-butylcyclohexy)peraxy-dicarbonate to said hardenable resin impregnated in the tubular resin absorbent material of said main pipe liner bag as a hardening catalytic substance.

4. A pipe lining method according to claim 1, wherein said hardenable resin impregnated in the tubular resin absorbent material of said main pipe liner bag is unsaturated polyester resin or vinyl ester resin, and said step of providing a main pipe liner bag includes setting viscosity of said hardenable resin in a range of 20 to 80 poises, and thixotropy of said hardenable resin in a range of 1.2 to 6.0 at temperature of 23° C.

5. A pipe lining method according to claim 1, wherein said tubular resin absorbent material of said main pipe liner bag is formed of unwoven fabric, said unwoven fabric being made of fiber having a size in a range of 1 to 15 deniers, and said step of everting and inserting said main pipe liner bag into the main pipe with a fluid pressure includes setting said fluid pressure acting inside said main pipe liner bag in a range of 0.2 to 1.5 kg/cm$^2$.

* * * * *